US012640023B2

(12) United States Patent
Lee

(10) Patent No.: US 12,640,023 B2
(45) Date of Patent: May 26, 2026

(54) CAMERA CAPABLE OF SELECTIVE DATA TRANSMISSION FOR PRIVACY PROTECTION

(71) Applicant: CHILLAX CARE LIMITED, San Po Kong (HK)

(72) Inventor: Wai Hung Lee, San Po Kong (HK)

(73) Assignee: CHILLAX CARE LIMITED, San Po Kong (HK)

( * ) Notice: Subject to any disclaimer, the term of this patent is extended or adjusted under 35 U.S.C. 154(b) by 97 days.

(21) Appl. No.: 18/700,734

(22) PCT Filed: May 12, 2023

(86) PCT No.: PCT/IB2023/054920

§ 371 (c)(1),
(2) Date: Apr. 12, 2024

(87) PCT Pub. No.: WO2023/233226

PCT Pub. Date: Dec. 7, 2023

(65) Prior Publication Data

US 2024/0412611 A1 Dec. 12, 2024

(30) Foreign Application Priority Data

May 30, 2022 (HK) .......................... 32022054309.6

(51) Int. Cl.
*G08B 13/196* (2006.01)

(52) U.S. Cl.
CPC . *G08B 13/19689* (2013.01); *G08B 13/19686* (2013.01); *G08B 13/19691* (2013.01); *G08B 13/19656* (2013.01); *G08B 13/1966* (2013.01)

(58) Field of Classification Search
CPC ........ G08B 13/19689; G08B 13/19686; G08B 13/19691; G08B 13/19656; G08B 13/1966; G08B 13/19613; G08B 21/0476; H04N 7/183
USPC .......................................... 348/143; 386/226
See application file for complete search history.

(56) References Cited

U.S. PATENT DOCUMENTS

| | | | | |
|---|---|---|---|---|
| 9,135,807 | B2 * | 9/2015 | Cirker | G07C 9/28 |
| 10,057,476 | B2 * | 8/2018 | Tanaka | H04N 23/66 |
| 11,218,664 | B2 * | 1/2022 | Lee | H04B 1/44 |
| 11,595,579 | B2 * | 2/2023 | Duran | H04N 23/73 |
| 12,361,749 | B2 * | 7/2025 | Kim | H04N 23/62 |
| 2004/0028391 | A1 * | 2/2004 | Black | H04N 7/181 348/E7.086 |

(Continued)

*Primary Examiner* — Helen Shibru
(74) *Attorney, Agent, or Firm* — Birchwood IP

(57) ABSTRACT

The present invention is a camera (1) capable of selective data transmission for privacy protection which comprises a video capturing module (11) for capturing a video stream; a video processing module (12) being arranged to process the captured video stream to perform analytics on the captured video stream to obtain analyzed data; a transceiver module (13) which is in data communication with the video processing module (12) and being arranged to transmit the analyzed data to a first network device (2); and a switching module (14) which is in data communication with the video capturing module (11) and the transceiver module (13) and being arranged to enable or disable transmission of the captured video stream from the video capturing module (11) to the transceiver module (13) for transmitting to the first network device (2) or a second network device (3).

14 Claims, 2 Drawing Sheets

(56) References Cited

U.S. PATENT DOCUMENTS

| | | | | |
|---|---|---|---|---|
| 2012/0236147 | A1* | 9/2012 | Addy | H04N 7/188<br>348/143 |
| 2023/0161917 | A1* | 5/2023 | Lee | G06F 21/6245<br>726/34 |

* cited by examiner

CAMERA CAPABLE OF SELECTIVE DATA TRANSMISSION FOR PRIVACY PROTECTION

FIELD OF THE INVENTION

The present invention relates to a camera and more particularly pertains to a camera capable of selective data transmission for privacy protection.

BACKGROUND OF THE INVENTION

Cameras are essential in various personal emergency response systems. However, in many personal emergency response systems, the cameras transfer live video streams or other sensitive personal data of users to monitoring centers or public domains accessible by the Internet, and this raises privacy concerns. Besides, wireless and Internet network security threats further raises the privacy concerns.

BRIEF SUMMARY OF THE INVENTION

In view of the aforesaid disadvantages now present in the prior art, the present invention provides a camera capable of selective data transmission for privacy protection. In the present invention, various analytics for detecting emergency or anomaly behavior are conducted in the video processing module of the camera, and users may decide to transmit only the analyzed data instead of the live video stream to caregivers or monitoring centers. As the live video stream, which may convey enormous amount of information relating to personal identity and behavioral details which include but not limited to the appearance of users and their guests as well as vital sensitive information, is not transferred over the network, the risk of unsecured transmission of such sensitive data is reduced and privacy protection is therefore enhanced.

To attain this, the camera capable of selective data transmission for privacy protection of the present invention comprises a video capturing module for capturing a video stream; a video processing module being arranged to process the captured video stream to perform analytics on the captured video stream to obtain analyzed data; a transceiver module which is in data communication with the video processing module and being arranged to transmit the analyzed data to a first network device; and a switching module which is in data communication with the video capturing module and the transceiver module and being arranged to enable or disable transmission of the captured video stream from the video capturing module to the transceiver module for transmitting to the first network device or a second network device.

The transceiver module comprises a first transceiver module and a second transceiver module; the first transceiver module is being arranged to transmit the analyzed data via a first communication channel to the first network device, and the second transceiver module is being arranged to transmit the captured video stream via a second communication channel which is independent from the first communication channel to the first network device or the second network device.

The first transceiver module and the second transceiver module are both 802.11 Standard WiFi transceiver modules, the first network device is a WiFi access point, and the second transceiver module is being arranged to transmit the captured video stream via the second communication channel to the first network device. Alternatively, the first transceiver module is a non-WiFi transceiver module and the first network device is a non-WiFi network device, the second transceiver module is a WiFi transceiver module and the second network device is a WiFi access point, and the second transceiver module is being arranged to transmit the captured video stream via the second communication channel to the second network device.

The first transceiver module and the second transceiver module are each in form of a wired transceiver module or a wireless transceiver module.

The analytics comprises one or more of the following: anomaly behavior analytics, emergency detection analytics, intrusion detection analytics, motion detection analytics, face recognition analytics, fall detection analytics.

The analyzed data comprises an alert notification.

The wireless camera further comprises a physical switch for controlling operation of the switching module.

The switching module is capable of being remotely controlled.

The video processing module comprises a classification module for classifying the analyzed data according to predetermined criteria to output a category of the analyzed data; the category of the analyzed data is transmitted to the switching module for controlling operation of the switching module. The classification module may classify the analyzed data by comparing the analyzed data against a pool of classified analyzed data stored in a storage module in data communication with the classification module. The category of analyzed data may comprise a normal category, a critical category and a dangerous category; if the normal category is transmitted to the switching module, the switching module is driven to disable transmission of the captured video stream from the video capturing module to the transceiver module for transmitting to the first network device or a second network device; if the critical category is transmitted to the switching module, the switching module is driven to intermittently enabling and disabling transmission of the captured video stream from the video capturing module to the transceiver module for transmitting to the first network device or a second network device at a predetermined interval; if the dangerous category is transmitted to the switching module, the switching module is driven to enable transmission of the captured video stream from the video capturing module to the transceiver module for transmitting to the first network device or a second network device.

The camera further comprises a signal post-processing module for blurring, masking, filtering, transforming, replacing, or silencing the captured video stream to generate a processed video stream for transmission by the transceiver module. The processed video streaming can fulfill the monitoring purpose while personal privacy can be further protected.

The camera further comprises a backup module for storing the captured video stream from the video capturing module and the analyzed data from the video processing module when the captured video stream and/or the analyzed data are not transmitted by the transceiver module.

DETAILED DESCRIPTION OF THE INVENTION

Figure 1:
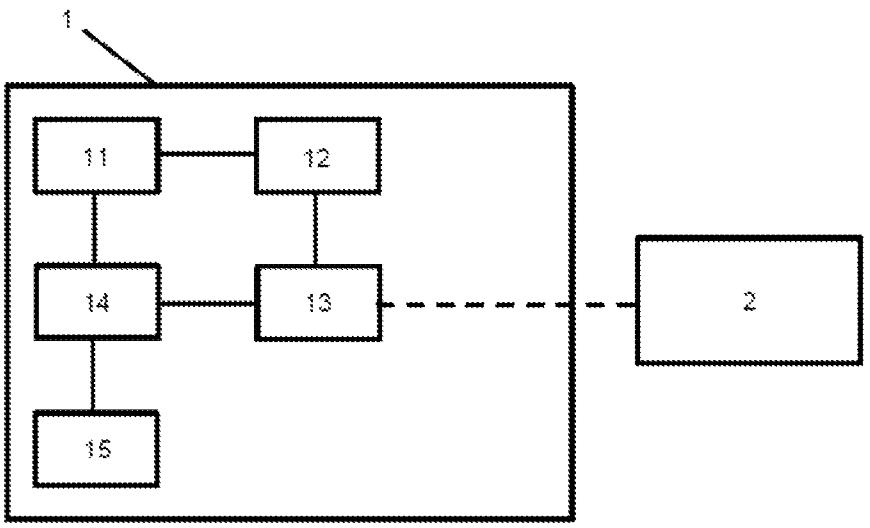
FIG. 1 is a block diagram of the first embodiment of the present invention.

FIG. 1 illustrates a first embodiment of the present invention. In this embodiment, the camera 1 comprises a video capturing module 11 for capturing a video stream with or without audio, a video processing module 12 being arranged to process the captured video stream to perform analytics on the captured video stream to obtain analyzed data, a transceiver module 13 which is in data communication with the video processing module 12 and being arranged to transmit the analyzed data to a first network device 2, and a switching module 14 which is in data communication with the video capturing module 11 and the transceiver module 13 and being arranged to enable or disable transmission of the captured video stream from the video capturing module 11 to the transceiver module 13 for transmitting to the first network device 2. A physical switch 15 is provided on the camera 1 for controlling operation of the switching module 14. For example, pushing the physical switch 15 to a first position may drive the switching module 14 to enable transmission of the captured video stream from the video capturing module 11 to the transceiver module 13 for transmitting to the first network device 2, and pushing the physical switch 15 to a second position may drive the switching module 14 to disable transmission of the captured video stream from the video capturing module 11 to the transceiver module 13 for transmitting to the first network device 2. The transition in the position of the physical switch 15 generates an alert notification as the analyzed data for transmission by the transceiver module 13 to the first network device 2. The physical switch 15 is also in operative communication with a mobile app, and the mobile app is configured to display the position of the physical switch 15 to remind the user whether the transmission of live video stream is active or not. In this way, the user may freely decide to enable or disable transmission of the live video stream to caregivers or monitoring centers for privacy concerns; even if the transmission of the live video stream is disabled, the analyzed data can still be transmitted to caregivers or monitoring centers for safety and accident prevention purposes. The provision of the physical switch 15 for disabling transmission of live video stream increases the trust level to end users.

Figure 2:
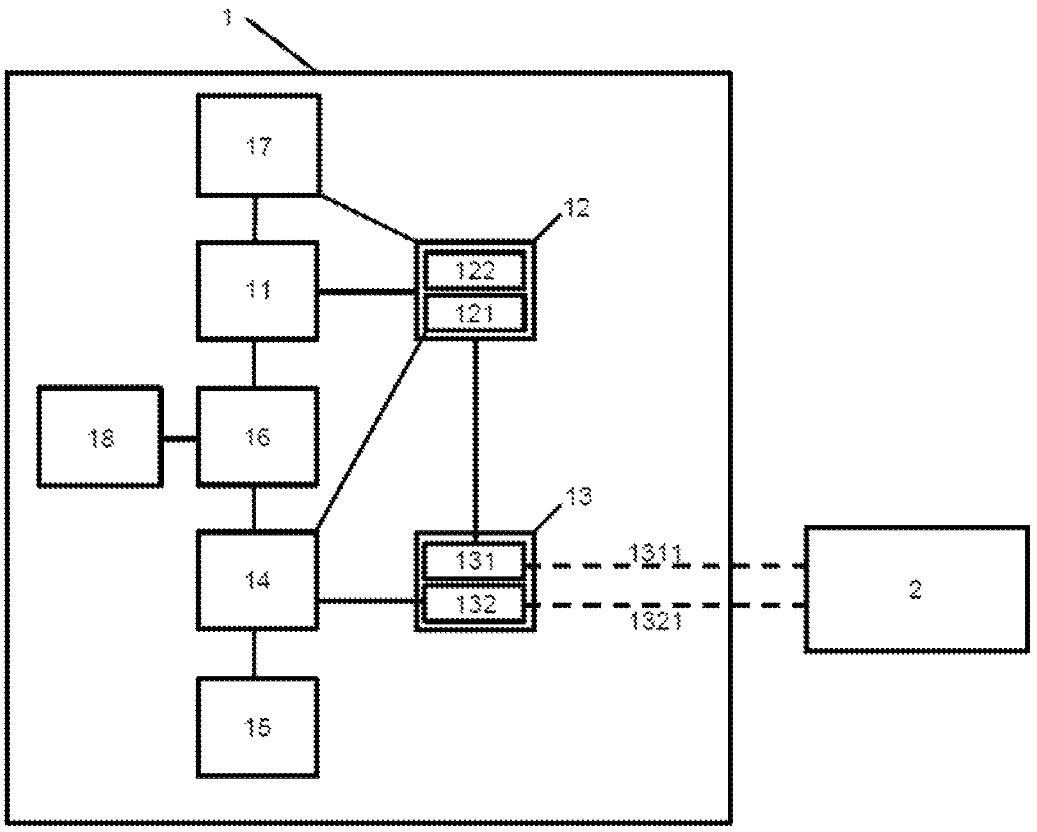
FIG. 2 is a block diagram of the second embodiment of the present invention.

FIG. 2 illustrates a second embodiment of the present invention. The second embodiment is the same as the first embodiment except for the following. In this embodiment, the transceiver module 13 comprises a first transceiver module 131 and a second transceiver module 132. The first transceiver module 131 is being arranged to transmit the analyzed data via a first communication channel 1311 to the first network device 2, and the second transceiver module 132 is being arranged to transmit the captured video stream via a second communication channel 1321 which is independent from the first communication channel 1311 to the first network device 2. The first transceiver module 131 and the second transceiver module 132 in this embodiment are both 802.11 Standard WiFi transceiver modules, and the first network device 2 is a WiFi access point.

In this embodiment, the analytics comprises fall detection analytics which tracks and analyzes the image motion deviation and tendency of a person joints to identify a body falling probability, and if the body falling probability exceeds a predetermined level, an alert notification is generated as the analyzed data for transmission by the first transceiver module 131 via the first communication channel 1311 to the first network device 2. It should be understood that the analytics may comprise various signal processing analytics available in the prior art including but not limited to anomaly behavior analytics, emergency detection analytics, intrusion detection analytics, motion detection analytics, face recognition analytics and so forth. Apart from generating an alert notification as the analyzed data, the analyzed data may also comprise image data within a specific timespan of the event detected such as the time of fall or other data. Details of various analytics and analyzed data, as well as mechanisms for transmitting video stream and various forms of analyzed data via the respective communication channels to the first network device 2 are available in the prior art and are therefore not detailed herein.

In this embodiment, the video processing module 12 comprises a classification module 121 for classifying the analyzed data according to predetermined criteria to output a category of the analyzed data. The category of the analyzed data is transmitted to the switching module 14 for controlling operation of the switching module 14. The classification module 121 classifies the analyzed data by comparing the analyzed data against a pool of classified analyzed data stored in a storage module 122 in data communication with the classification module 121. The category of analyzed data comprises a normal category, a critical category and a dangerous category. If the normal category is transmitted to the switching module 14, the switching module 14 is driven to disable transmission of the captured video stream from the video capturing module 11 to the second transceiver module 132 for transmitting to the first network device 2; if the critical category is transmitted to the switching module 14, the switching module 14 is driven to intermittently enabling and disabling transmission of the captured video stream from the video capturing module 11 to the second transceiver module 132 for transmitting to the first network device 2 via the second communication channel 1321 at a predetermined interval; if the dangerous category is transmitted to the switching module 14, the switching module 14 is driven to enable transmission of the captured video stream from the video capturing module 11 to the second transceiver module 132 for transmitting to the first network device 2 via the second communication channel 1321.

In this embodiment, the camera 1 further comprises a signal post-processing module 16 for blurring, masking, filtering, transforming, replacing, or silencing the captured video stream to generate a processed video stream for transmission by the second transceiver module 132 via the second communication channel 1321 to the first network device 2. The post-processing performed by the signal post-processing module 16 may include any of the following: blurring faces or sensitive conversation, filtering keywords in audio, masking faces or specified objects, transforming human body into different forms which serve the purpose of monitoring while the personal identify is erased, replacing sounds in the audio with another sounds, or replacing a region of monitoring area with a specified image.

The signal post-processing module 16 is in operative communication with a mobile app, and the mobile app is configured to control and configure the post-processing performed by the signal post-processing module 16. It should be noted that the post-processing is independent of pan/tilt/zoom operation of the camera 1. In other words, the specified regions, objects, personal faces are recognized and the corresponding image areas are identified before the post-processing operations are applied to the image areas.

In this embodiment, the camera 1 further comprises a second physical switch 18 which can control operation of the signal post-processing module 16. For example, pushing the second physical switch 18 to a first position may drive the signal post-processing module 16 to disable all post-processing operation to the captured video stream from the video capturing module 11, and pushing the second physical switch 18 to a second position may drive the signal post-processing module 16 to enable blurring, audio filtering operations to the captured video stream from the video capturing module 11, and pushing the second physical switch 18 to a third position may drive the signal post-processing module 16 to enable all operations to the captured video stream from the video capturing module 11. The transition in the position of the second physical switch 18 generates an alert notification as the analyzed data for transmission by the first transceiver module 131 via the first communication channel 1311 to the first network device 2. The mobile app is configured to display the position of second physical switch 18 to remind the user the active operational mode of the signal post-processing module 16.

In this embodiment, the camera 1 further comprises a backup module 17 for storing the captured video stream from the video capturing module 11 and the analyzed data from the video processing module 12 when the captured video stream and/or the analyzed data are not transmitted by the transceiver module 13.

In this embodiment, the switching module 14 is capable of being remotely controlled, for example by means of a mobile phone app. Disabling data transmission of the second transceiver module 132 when transmission of live video stream is not required helps to reduce power consumption, so that the lifetime of the camera 1 could be extended.

Figure 3:
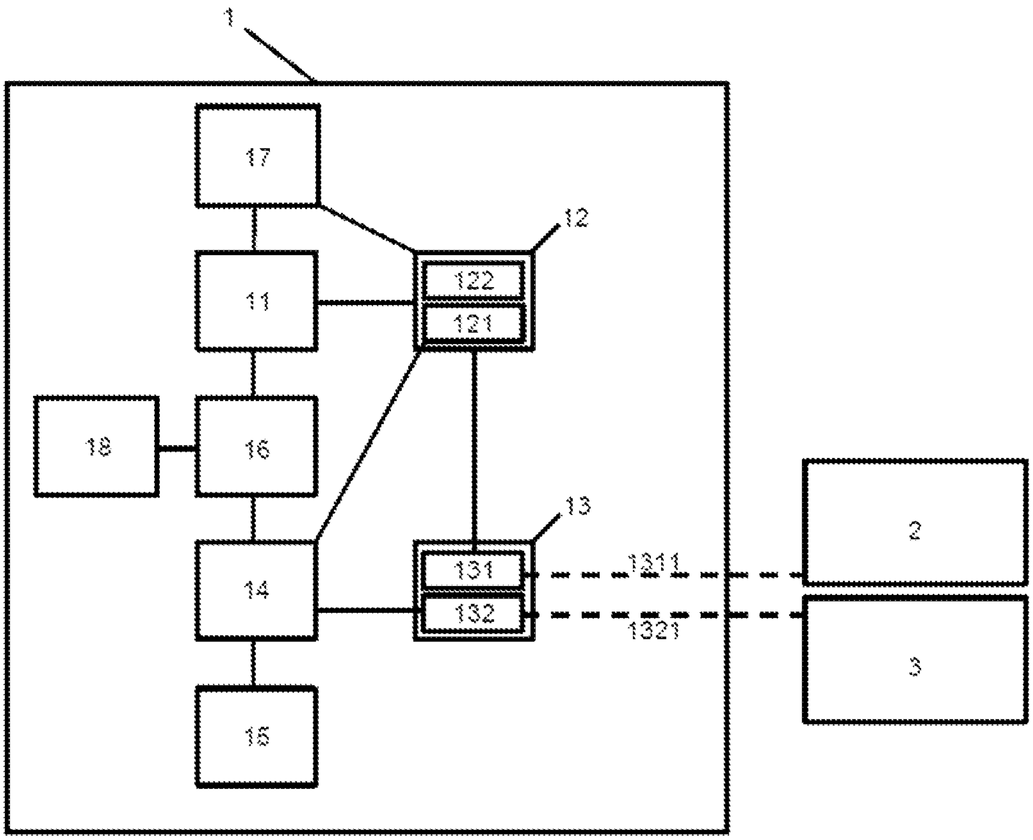
FIG. 3 is a block diagram of the third embodiment of the present invention.

FIG. 3 illustrates a third embodiment of the present invention. The third embodiment is the same as the second embodiment except for the following. In this embodiment, the second transceiver module 132 is being arranged to transmit the captured video stream via the second communication channel 1321 which is independent from the first communication channel 1311 to a second network device 3. The first transceiver module 131 is non-WiFi transceiver module and the first network device 2 is a non-WiFi network device; the second transceiver module 132 is a 802.11 Standard WiFi transceiver module and the second network device 3 is a WiFi access point. The non-WiFi transceiver module in this embodiment may be a wired transceiver module or wireless transceiver module such as Bluetooth transceiver module or other transceiver modules using short range RF technologies such as 2.4G RF, Zigbee, Bluetooth Low Energy and so forth, and the non-WiFi network device is an access point provided with a wired/wireless module corresponding to the first transceiver module 131 and a network interface for connecting to a wired or wireless network.

It is understood that the present invention should not be limited to the embodiments as described. Any changes, modifications, replacements, combinations and simplification without deviating from the essence and principle of the present invention should be considered alternative configurations that are equally effective and should also fall within the scope of protection of the present invention.

What is claimed is:

1. A camera capable of selective data transmission for privacy protection comprising:

a video capturing module for capturing a video stream with or without audio;

a video processing module being arranged to process the captured video stream to perform analytics on the captured video stream to obtain analyzed data;

a transceiver module which is in data communication with the video processing module and being arranged to transmit the analyzed data to a first network device;

a switching module which is in data communication with the video capturing module and the transceiver module and being arranged to enable or disable transmission of the captured video stream from the video capturing module to the transceiver module for transmitting to the first network device or a second network device; and a physical switch for controlling operation of the switching module to enable or disable transmission of the captured video stream from the video capturing module to the transceiver module for transmitting to the first network device or a second network device;

in case transmission of the captured video stream is disabled, the analyzed data is still transmitted to the user.

2. The camera as in claim 1, characterized in that the transceiver module comprises a first transceiver module and a second transceiver module; the first transceiver module is being arranged to transmit the analyzed data via a first communication channel to the first network device, and the second transceiver module is being arranged to transmit the captured video stream via a second communication channel which is independent from the first communication channel to the first network device or the second network device.

3. The camera as in claim 2, characterized in that the first transceiver module and the second transceiver module are both 802.11 Standard WiFi transceiver modules, the first network device is a WiFi access point, and the second transceiver module is being arranged to transmit the captured video stream via the second communication channel to the first network device.

4. The camera as in claim 2, characterized in that the first transceiver module is a non-WiFi transceiver module and the first network device is a non-WiFi network device, the second transceiver module is a WiFi transceiver module and the second network device is a WiFi access point, and the second transceiver module is being arranged to transmit the captured video stream via the second communication channel to the second network device.

5. The camera as in claim 2, characterized in that the first transceiver module and the second transceiver module are each in form of a wired transceiver module or a wireless transceiver module.

6. The camera as in claim 1, characterized in that the analytics comprises one or more of the following: anomaly behavior analytics, emergency detection analytics, intrusion detection analytics, motion detection analytics, face recognition analytics, fall detection analytics.

7. The camera as in claim 1, characterized in that the analyzed data comprises an alert notification.

8. The camera as in claim 1, characterized in that the switching module is capable of being remotely controlled.

9. The camera as in claim 1, characterized in that the video processing module comprises a classification module for classifying the analyzed data according to predetermined criteria to output a category of the analyzed data; the category of the analyzed data is transmitted to the switching module for controlling operation of the switching module.

10. The camera as in claim 9, characterized in that the classification module classifies the analyzed data by comparing the analyzed data against a pool of classified analyzed data stored in a storage module in data communication with the classification module.

11. The camera as in claim 9, characterized in that the category of analyzed data comprises a normal category, a critical category and a dangerous category; if the normal category is transmitted to the switching module, the switching module is driven to disable transmission of the captured video stream from the video capturing module to the transceiver module for transmitting to the first network device or a second network device; if the critical category is transmitted to the switching module, the switching module is driven to intermittently enabling and disabling transmission of the captured video stream from the video capturing module to the transceiver module for transmitting to the first network device or a second network device at a predetermined interval; if the dangerous category is transmitted to the switching module, the switching module is driven to enable transmission of the captured video stream from the video capturing module to the transceiver module for transmitting to the first network device or a second network device.

12. The camera as in claim 1, characterized in that it further comprises a signal post-processing module for blurring, masking, filtering, transforming, replacing, or silencing the captured video stream to generate a processed video stream for transmission by the transceiver module.

13. The camera as in claim 12, characterized in that it further comprises a second physical switch for controlling operation of the signal post-processing module.

14. The camera as in claim 1, characterized in that it further comprises a backup module for storing the captured video stream from the video capturing module and the analyzed data from the video processing module when the captured video stream and/or the analyzed data are not transmitted by the transceiver module.

* * * * *